May 6, 1952   E. H. FLETCHER ET AL   2,596,020
HOSE COUPLING
Filed Oct. 19, 1949
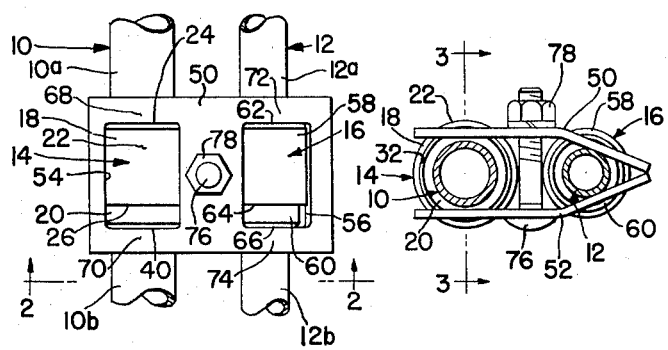
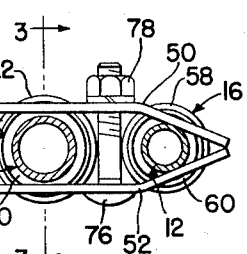
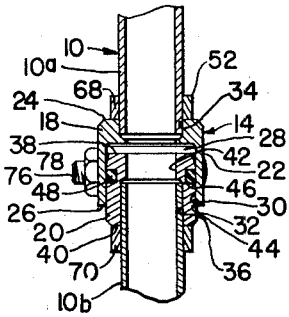
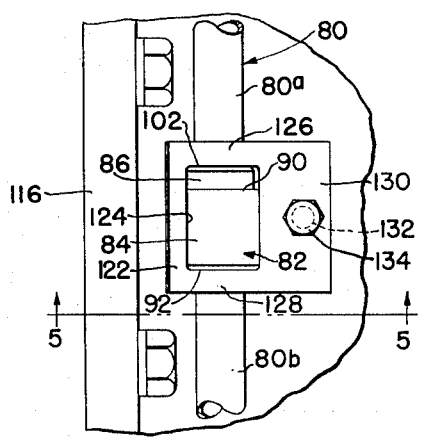
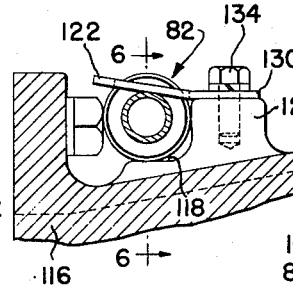
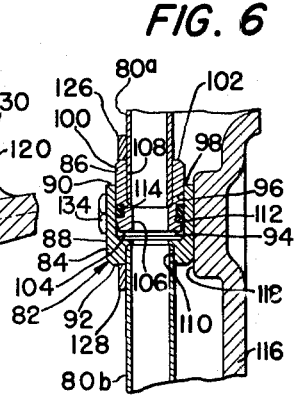
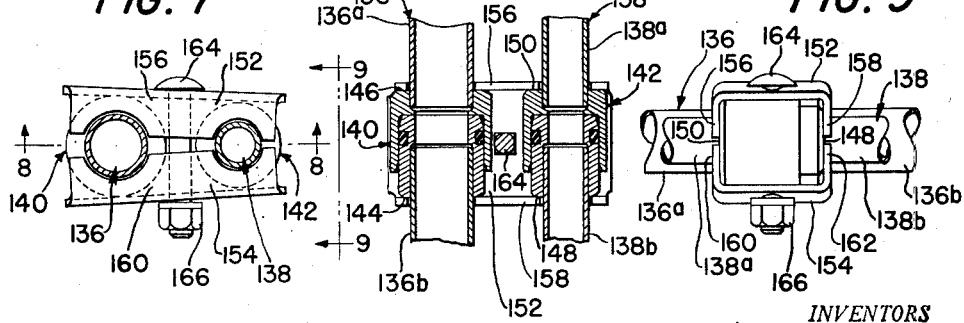
INVENTORS
E. H. FLETCHER &
L. D. ETHINGTON
ATTORNEYS

Patented May 6, 1952

2,596,020

UNITED STATES PATENT OFFICE 2,596,020

HOSE COUPLING

Edward H. Fletcher, Waterloo, and Lloyd D. Ethington, Cedar Falls, Iowa, assignors to Deere Manufacturing Co., Dubuque, Iowa, a corporation of Iowa Application October 19, 1949, Serial No. 122,292

15 Claims. (Cl. 285—210)

This invention relates to a coupling assembly for interconnecting in coaxial end-to-end relationship a pair of fluid lines such as hoses or the like.

The invention pertains more particularly to improvements in the type of hose coupling in which a pair of hoses or the like are releasably interconnected for axial separation. The principal object of the invention is to simplify the coupling and to provide, in addition to the coupling, means associated therewith for maintaining the position of a pair of hoses with respect to other structural elements, such as an additional pair of hoses or a support on which the hoses are carried. The invention has for a feature thereof the provision of an improved coupling in which a male part is fitted simply into a female part and is retained by a retainer plate having an opening therein so dimensioned as to engage retainer portions on the male and female parts to prevent axial separation thereof. In view of the simplicity of the interconnection between these two parts, the sealing of the connection against the escape of fluid is simplified. To this end, the invention involves a coupling in which the parts are merely axially connectible without the use of threads or other complicated connecting structure.

The foregoing and other important objects and desirable features encompassed by and inherent in the invention will become apparent to those versed in the art as certain preferred embodiments of the invention are fully disclosed in the following detailed description and accompanying sheet of drawings, in which Figure 1 is a plan view of one form of coupling assembly associated with a pair of coupling units and a pair of parallel hoses;

Figure 2 is an end view of the structure of Figure 1, partly in section as viewed along the line 2—2 of Figure 1;

Figure 3 is a longitudinal sectional view taken on the line 3—3 of Figure 2;

Figure 4 is a plan view of a modified form of coupling in which retainer means is provided for mounting the assembled coupling on a support;

Figure 5 is a transverse sectional view taken on the line 5—5 of Figure 4;

Figure 6 is a longitudinal sectional view taken on the line 6—6 of Figure 5;

Figure 7 is an end view of a third form of coupling and retainer assembly;

Figure 8 is a longitudinal sectional view taken substantially on the line 8—8 of Figure 7; and Figure 9 is a side elevational view as seen along the line 9—9 of Figure 7.

In general

The preferred embodiments of the invention illustrated are those selected on the bases of simplicity in manufacture and efficiency in use. However, modifications of the embodiments illustrated will readily occur to those versed in the art as the description progresses. Further, reference in the following specification and appended claims to the parts as having inner or outer and front and rear ends or sides, etc., is made merely for the purpose of facilitating an understanding of the particular forms of the invention illustrated. It should be understood, of course, that the forms shown and described are merely representative and should not be construed as in any way limiting the scope or application of the principles of the invention.

Figures 1, 2 and 3

(Reference numerals 10–76)

In this form of the invention there are indicated at 10 and 12 a pair of fluid lines such as hoses or the like. The hose 10 comprises a pair of hose sections the proximate ends 10$^a$ and 10$^b$ of which are arranged in coaxial end-to-end relationship and interconnected by a coupling assembly designated generally by the numeral 14. The hose 12 comprises a pair of hose sections the proximate ends 12$^a$ and 12$^b$ of which are disposed in coaxial end-to-end relationship and interconnected by a coupling unit designated generally by the numeral 16. As illustrated, the diameter of the hose 12 is somewhat smaller than that of the hose 10. Certain peculiarities in the design of the structure to be described hereinafter are related to the difference in diameter between the two hoses; however, for all practical purposes, the hoses 10 and 12 may be considered as having equal diameters.

The coupling 14 comprises a first or female part 18 and a second or male part 20. The female part 18 comprises a coupling member or fitting preferably having an exterior cylindrical surface 22 and opposite or first and second radial end portions 24 and 26. The female fitting further has a recess 28 provided with a cylindrical interior surface 30 concentric with the external surface 22 and opening at the end 26 as a circular mouth 32. The recess 28 is preferably provided as a bore which communicates axially with a reduced counterbore 34 opening at the end 24 of the fitting 18. The recess 28 and bore 34 thus constitute a continuous bore or passage extending axially or lengthwise through the fitting 18. The reduced bore 34 is adapted to permanently receive the end portion 10ª of the proximate hose section of the hose 10. The manner in which the hose portion is secured to the fitting 18 is immaterial here and need not be further described.

The male part 20 of the coupling assembly has an external cylindrical surface 36 and opposite radial ends 38 and 40, and further has a passage therethrough made up of a bore 42 and a slightly enlarged counterbore 44. The counterbore 44 constitutes means for receiving the proximate end 10ᵇ of the hose section comprising part of the hose 10. The manner in which the end 10ᵇ of the hose is secured to the fitting or male portion 20 is immaterial and need not be further described.

The assembly of the coupling members or parts is illustrated in Figure 3, wherein it is shown that the male part 20 fits within the female part 18, the diameter of the external cylindrical surface 36 of the part 20 being slightly less than the diameter of the interior cylindrical surface 30 of the recess 28, whereby the parts may be connected or disconnected by relative movement thereof along a straight-line path. Stated otherwise, the coupling parts 18 and 20 are coaxial when assembled and are axially connectible and separable. The end 38 of the male part 20 has a slight chamfer to facilitate insertion thereof into the recess 28.

The male part 20 is provided with an annular groove 46 which carries a circular seal in the form of a rubber ring 48 for cooperation with a portion of the interior cylindrical surface of the recess 28. The assembly of the coupling parts is characterized by extreme simplicity. No threaded connections are utilized and the sealing thereof is readily accomplished by the seal 48.

The two coupling parts are retained in assembled or interconnected relationship by retainer means including a pair of plates or equivalent plate-like elements 50 and 52. The plate 50 has a pair of generally rectangular apertures 54 and 56 therein which respectively receive the assembled coupling parts 18 and 20 of the coupling 14 and related parts for the coupling 16, which parts comprise a female member 58 and a male member 60. The coupling parts 58 and 60 are identical to the parts 18 and 20 and, although not illustrated in detail, the interior of the coupling assembly 16 is the same as that of the coupling assembly 14. The female member or part 58 of the coupling assembly 16 has opposite radial ends 62 and 64 and the part 60 has opposite radial ends, only one of which is visible at 66 in Figure 1.

Referring now to the coupling assembly 14, it will be seen that when the two coupling parts 18 and 20 are assembled, the one end 38 of the part 20 is confined within the recess 28 of the other part 18, whereas the other end 40 of the part 20 is exposed at the mouth of the recess 28. Hence, the end 40 of the member 20 and the end 24 of the member 18 are axially spaced apart. Since these end portions are radial as respects the common axis of the assembly, they respectively provide retaining portions transverse to the coupling axis, or transverse to the straight-line path along which the parts are connected or disconnected.

The rectangular shape of the opening 54 in the plate 50 is designed for the purpose of accommodating the retaining portions provided by the spaced-apart ends 24 and 40. For this reason, the opening 54 is defined at opposite ends, respectively, by plate portions 68 and 70 which define opposite, straight-across edges spaced apart on the order of the axial spacing between the ends 24 and 40. The transverse dimension between opposite sides of the rectangular opening 54 is slightly less than the diameter of the external cylindrical surface 22 of the part 18. Hence, when the plate is fitted over the assembled couplings, the retainer portions provided at 68 and 70 on the plate engage the retainer portions provided by the spaced-apart ends 24 and 40 of the coupling parts 18 and 20 respectively. The general plane of the plate is parallel to the axis of the assembled coupling and cuts the cylindrical surface 22. Since the plate 50 is of rigid or unitary construction, the couplings are confined both laterally and transversely and cannot become axially separated, nor can they become laterally displaced relative to the coupled hose sections 12ª and 12ᵇ of the hose 12.

As stated above, the coupling assembly 16, apart from size, is identical to that of the coupling assembly 14. Hence, the spaced-apart ends 62 and 66 of the coupling parts 58 and 60 provide retainer portions which are respectively engaged by retainer portions provided by opposite plate portions 72 and 74 which define opposite edges or ends of the other opening 56 in the plate 50. That portion of the plate 50 in which the opening 56 is provided is associated with the coupling assembly 16 as seen in Figure 2; and, although the plate portion referred to is displaced out of the plane of the plate portion in which the opening 54 is provided, the relationship of both parts of the plate respectively to the coupling assemblies 14 and 16 is the same. Since the openings 54 and 56 cannot pass completely over the coupling assemblies 14 and 16, the plate serves to fix the lateral spacing between the coupled hoses 10 and 12.

The lower plate 52 is identical to the plate 50 and has a pair of rectangular openings (not shown) respectively associated with the couplings 14 and 16 in the same manner as the openings 54 and 56 are associated with the couplings at diametrically opposed portions thereof. The plates lie respectively on opposite sides of the pair of coupling assemblies and are provided with securing means in the form of a securing member or bolt 76 which passes through the two plates 50 and 52 and between the coupled hoses 10 and 12. A nut 78 completes the assembly of the securing means.

*Figures 4, 5 and 6*

(Reference numerals 80–134)

In this form of the invention, there is provided a coupling and mounting assembly for a hose 80 comprising a pair of hose sections 80ª and 80ᵇ. The coupling assembly is designated by the numeral 82 and is made up of a female part 84 and male part 86. The female part 84 has an exterior cylindrical surface 88, opposite radial ends 90 and 92 and a recess 94 having an interior cylindrical surface 96. The recess 94 opens at the radial end 90 to form a circular mouth 98 through which the recess receives the male member or fitting 86, the latter having an exterior cylindrical surface 100, opposite radial ends 102 and 104 and a through passage made up of a bore 106 and slightly enlarged counterbore 108. The counterbore 108 permanently receives the hose section 80ª. The female member 84 has a reduced counterbore 110 which permanently receives the hose section 80ᵇ.

When the coupling parts or members are assembled as shown in Figure 6, the inner end 104 of the male member is received within the recess 94 of the female member 84. The other end 102 of the member 86 is exposed through the mouth 98 of the recess 94 and this end and the remote radial end 92 of the female member 84 are axially spaced apart. The exterior cylindrical surface 100 of the member 86 is provided with an annular groove 112 within which is received a sealing ring 114 similar to the ring 48 in Figures 1, 2 and 3. This sealing ring cooperates with the interior cylindrical surface 96 of the recess 94.

The assembled coupling and hoses are adapted to be mounted on a support designated generally by the numeral 116. This support has an upper mounting surface 118 alongside of which is a tapped boss 120 which constitues means for receiving a securing element to be presently described. As best shown in Figure 5, the coupling is located in the corner provided by the surface 118 and the boss 120. The coupling is retained in this position by a retainer plate 122 which is constructed after the manner of either of the plates 50 or 52 of the modification shown in Figures 1, 2 and 3, except that the plate 122 has therein only a single, generally rectangular aperture 124 defined at opposite ends by plate portions 126 and 128 which provide edges spaced apart on the order of the axial spacing between the ends 102 and 92 of the coupling parts 86 and 84 respectively. The size and shape of the openings with respect to the assembled coupling 82 are the same as that of the opening 54, for example, with respect to the assembled coupling 14 of Figures 1, 2 and 3. What has been said in connection with the couplings and retainers therefor previously described applies also to the construction shown in Figures 4, 5 and 6, and further detailed description may be omitted in the interests of brevity.

The plate 122 extends into a mounting portion 130 which is apertured at 132 to receive a cap screw 134 which is threaded into the tapped boss 120. The cap screw thus provides securing means for mounting the retainer plate 122 to the support 116, and the retainer plate functions not only to prevent axial separation of the coupling parts 84 and 86 but to prevent displacement of the coupling assembly relative to the support 116.

In other respects, the form of the invention just described is identical to that described above in connection with Figures 1, 2 and 3.

Figures 7, 8 and 9

(Reference numerals 136–166)

The coupling and retainer assembly provided in this form of the invention follows somewhat the design of that illustrated and described in connection with Figures 1, 2 and 3. There are provided a pair of hoses 136 and 138 respectively made up of sections or end portions 136$^a$, 136$^b$ and 138$^a$, 138$^b$. The two hose sections 136$^a$ and 136$^b$ are interconnected by a coupling assembly designated generally by the numeral 140. The coupling assembly for the hose sections 138$^a$ and 138$^b$ is designated by the numeral 142.

Since the coupling assemblies 140 and 142 are respectively identical to the coupling assemblies 14 and 16 of Figures 1, 2 and 3, as will be obvious from an inspection of the drawings, the description thereof will be only general. The male and female parts of the coupling assembly 140 have axially spaced-apart, radial ends 144 and 146, and the male and female parts of the coupling assembly 142 have axially spaced-apart, radial end portions 148 and 150. As is the case in Figures 1, 2 and 3, the respective end portions are in transverse alinement when the coupling parts are assembled. Thus, these end portions serve as retaining portions for cooperation with retaining means including a pair of plates 152 and 154.

The upper plate 152 is adapted to embrace the side-by-side assembled couplings 140 and 142. In this case, the plate, though pocketed in a manner equivalent to the pocketing of the plate 50 by the openings 54 and 56 (Figures 1, 2 and 3), has opposite depending end portions 156 and 158 which respectively engage the transversely alined end portions 144 and 148 and 146 and 150. These end portions are provided with arcuate notches to accommodate the hoses 136 and 138. The lower plate 154 is likewise provided with opposite end portions 160 and 162 which respectively engage the end portions in a manner similar to the function of the end portions 156 and 158. Hence, the assembled retainer plates (see Figure 9) embrace the coupled hoses from diametrically opposite sides. The plates are secured together by a bolt 164 which passes through the plates and between the spaced-apart couplings 140 and 142. A nut 166 completes the assembly.

Summary

It will be noted that in each of the modifications illustrated, the design is characterized by simplicity and by a retainer means which not only functions to prevent the couplings from axially separating but also to maintain the couplings in a fixed position with respect to other structure. In Figures 1, 2 and 3 and in Figures 7, 8 and 9, the retainer structure serves to fix the spaced relationship between a pair of parallel hose portions. In Figures 4, 5 and 6, the retainer means serves to fix a single pair of hose sections with respect to a support. The simplicity in the design of the retainer structure in Figures 1, 2 and 3 and that in Figures 7, 8 and 9 follows primarily from the fact that the coupling assemblies, although not exactly identical, are of similar critical dimensions, whereby the rectangular plate with rectangular openings (or equivalent structure as provided by the end portions 156, 158 and 160, 162 of Figures 7, 8 and 9) may be utilized. Since the length of one coupling assembly is the same as the length of the coupling assembly with which it is used, the retainer portions provided at opposite ends of the coupling assemblies are in transverse alinement and the plates and the openings or retainer portions thereon may be conveniently fabricated.

Other features and advantages of the invention not specifically enumerated above will undoubtedly occur to those versed in the art, as likewise will numerous modifications and alterations in the preferred embodiments of the invention illustrated, all of which may be achieved without departing from the spirit and scope of the invention as defined in the appended claims.

What is claimed is:

1. A coupling of the character described, comprising: a first coupling member having opposite ends and provided with a recess having an open circular mouth at one of said ends and an interior, coaxial cylindrical surface, the other of said ends having an exterior retainer portion thereon transverse to the axis of said surface;

a second coupling member having opposite ends and provided with an external cylindrical surface leading to one end of said second member and of slightly less diameter than the interior cylindrical surface so that the second member may be inserted axially through the mouth of and into the recess with said one end of said second member disposed within the recess and the other end of said second member exposed at the mouth of the recess, said exposed end having a retainer portion thereon transverse to the axis of said cylindrical surfaces and being spaced axially of the assembled members from the aforesaid retainer portion on the first member; and retainer means for interconnecting the coupling members against axial separation, including a plate-like element partially embracing the assembled members and having retainer portions spaced apart on the order of the spacing of the retainer portions of the members and respectively engaging the latter.

2. The invention defined in claim 1, further characterized in that: the cylindrical surface of one member has an annular groove, and a circular seal is carried in the groove and cooperates with the cylindrical surface of the other member.

3. The invention defined in claim 1, further characterized in that: the retainer means includes a pair of separable, plate-like elements, one embracing the assembled coupling members from each side and each having retainer portions spaced apart on the order of the spacing of the retainer portions on the members and respectively engaging the latter; and means interconnecting the plate-like elements.

4. The invention defined in claim 1, further characterized in that: the plate-like element has an opening therein of sufficient size to fit partially over the assembled coupling members, opposite end portions of the element defining respectively edges bordering the opening and providing the aforesaid element retainer portions for respectively engaging the member retainer portions.

5. A coupling assembly for interconnecting proximate ends of a pair of parallel hoses or the like, comprising: a pair of first coupling members, each having opposite ends and provided with a recess having a mouth opening at one of said ends and further having an interior cylindrical surface, each member having its other end formed with an external retainer portion transverse to the axis of its cylindrical surface; said members being arranged in side-by-side, spaced apart parallel relationship with their retainer portions in transverse alinement and with the mouths of the recesses opening in the same direction; a pair of second coupling members respectively complementary to the first members, each having opposite ends and an external cylindrical surface, said second members being respectively axially receivable into the recesses through the recess mouths of the first members, each of the second members being of such axial dimension as to have one end thereof exposed at the mouth of the respective recess, each exposed end having an external transverse retainer portion thereon spaced axially from the retainer portion on the respective first member, said second member retainer portions being in transverse alinement; and retaining means for securing the complementary members against axial separation, including a plate-like element embracing the assembled members from at least one side and having means for holding the members in parallelism, and further having transverse retainer portions spaced apart on the order of the axial spacing of the member retainer portions and respectively engaging the latter.

6. The invention defined in claim 5, further characterized in that: the retaining means includes a pair of similar plate-like members of the type aforesaid and embracing the pairs of members from diametrically opposite sides; and a securing member passed through the elements between the parallel assembled coupling members for clamping the elements together with the coupling members therebetween.

7. A coupling assembly for interconnecting proximate ends of a pair of parallel hoses or the like, comprising: a pair of first coupling members, each having opposite ends and provided with a recess having a mouth opening at one of said ends and further having an interior cylindrical surface, each member having its other end formed with an external retainer portion transverse to the axis of its cylindrical surface; said members being arranged in side-by-side, spaced apart parallel relationship with their retainer portions in transverse alinement and with the mouths of the recesses opening in the same direction; a pair of second coupling members respectively complementary to the first members, each having opposite ends and an external cylindrical surface, said second members being respectively axially receivable into the recesses through the recess mouths of the first members, each of the second members being of such axial dimension as to have one end thereof exposed at the mouth of the respective recess, each exposed end having an external transverse retainer portion thereon spaced axially from the retainer portion on the respective first member, said second member retainer portions being in transverse alinement; and retaining means for securing the complementary members against axial separation, including a pair of plates lying crosswise of the side-by-side assembled members and respectively embracing the members from diametrically opposite sides, each plate having a pair of openings therein spaced apart transversely on the order of the parallel spacing of the members and each opening having opposite end edges provided respectively by transverse plate portions spaced apart on the order of the axial spacing between the member retainer portions, said edges respectively engaging said member retainer portions; and a securing element normal to the plates and passed between the side-by-side members and through the plates for clamping the plates together with the members therebetween.

8. A coupling assembly of the character described, comprising: a first coupling member having an outer cylindrical surface, axially spaced, first and second radial ends, and a recess opening at the first end and having a concentric interior cylindrical surface; a second coupling member having an outer cylindrical surface and axially spaced, first and second radial ends, said outer cylindrical surface of the second member having a diameter slightly less than that of the interior cylindrical surface of the first member so that the second member is axially receivable in the first member recess with the first end of said second member within said recess and the second end of the second member exposed at the open end of the recess and hence axially spaced from the second end of the first member; and a retainer plate disposed in a plane parallel to the axis of the assembled members and cutting the cylindrical outer surface of the first member, said plate having a generally rectangular opening therein through which a portion of said first member outer cylindrical surface projects, opposite end portions of the plate respectively deforming one pair of opposite edges of said opening being spaced apart on the order of the axial spacing between said second ends of the assembled members, said end portions of the plate respectively engaging said second ends of the members to hold said members against axial separation.

9. The invention defined in claim 8, further characterized in that: there are two such plates symmetrically arranged at diametrically opposed sides of the assembled members; and means is provided for securing the plates together.

10. The invention defined in claim 8, further characterized in that: a second pair of assembled and similar coupling members is arranged in spaced relation alongside and with its axis parallel to that of the aforesaid assembled coupling members; and the plate has a pair of generally rectangular openings, one for each pair of assembled coupling members and retaining each pair of assembled coupling members in the manner aforesaid.

11. The invention defined in claim 10, further characterized in that: there are two such plates symmetrically arranged generally in parallelism at diametrically opposite sides of the assembled pairs of coupling members; and a securing element passes between the assembled pairs of coupling members generally normal to the plates and having opposite end portions respectively connected to the plates.

12. A coupling assembly of the character described for mounting on a support having a mounting surface and provision thereon for receiving securing means, comprising: a pair of interfitting coupling members formed respectively with male and female portions selectively connectible or disconnectible along a straight-line path, each member having an external retainer portion transverse to the aforesaid path, said portions being spaced apart along said path when the coupling members are assembled; and a retainer clip for mounting the assembled members on the support, said clip being of plate-like construction having a first opening therein to receive securing means for cooperation with the support to mount the assembled coupling members between said clip and the mounting surface, and said clip further having a second opening therein only partially embracing the assembled coupling members and provided at opposite ends with retainer portions spaced apart on the order of and respectively engaging the coupling member retainer portions for securing the coupling members against disconnection along the aforesaid path.

13. The invention defined in claim 12, further characterized in that: said clip has means thereon engaging at least one of the coupling members to hold the assembled members against displacement relative to the support in a direction crosswise of said path.

14. A coupling assembly of the character described, comprising: first and second pairs of coupling members each made up of interfitting male and female members selectively connectible or disconnectible along a straight-line path and respectively having external retainer portions thereon which are spaced apart along said path when the members are assembled; said pairs of members being arranged in side-by-side, spaced-apart relationship so that the path of connection or disconnection of the members of one pair generally parallels the path of connection or disconnection of the members of the other pair, and with the retainer portions of the female members and male members respectively in alinement transverse to said paths, and a single retaining means common to both pairs of assembled coupling members and having portions engaging the member retainer portions for securing both pairs of members against disconnection and further having portions engaging at least one member of each pair for fixing the pairs of members in the aforesaid side-by-side spaced apart relationship.

15. The invention defined in claim 1, further characterized in that: the plate-like element has an opening therein apart from the retainer portions and adapted to receive securing means for mounting the assembled members and element on a support.

EDWARD H. FLETCHER.
LLOYD D. ETHINGTON.

REFERENCES CITED

The following references are of record in the file of this patent:

UNITED STATES PATENTS

| Number | Name | Date |
| --- | --- | --- |
| 1,436,882 | Kneppey | Nov. 28, 1922 |
| 2,020,156 | Muchnic | Nov. 5, 1935 |
| 2,043,935 | Stebbins | June 9, 1936 |
| 2,360,732 | Smith | Oct. 17, 1944 |